US012651761B2

(12) United States Patent
Kim

(10) Patent No.: US 12,651,761 B2
(45) Date of Patent: Jun. 9, 2026

(54) APPARATUS FOR MANUFACTURING FUEL CELL AND METHOD OF MANUFACTURING SAME

(71) Applicants: HYUNDAI MOTOR COMPANY, Seoul (KR); KIA CORPORATION, Seoul (KR)

(72) Inventor: Min Jin Kim, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 586 days.

(21) Appl. No.: 17/985,659

(22) Filed: Nov. 11, 2022

(65) Prior Publication Data

US 2023/0223574 A1     Jul. 13, 2023

(30) Foreign Application Priority Data

Jan. 10, 2022    (KR) ......................... 10-2022-0003223

(51) Int. Cl.
*H01M 8/1004* (2016.01)
*H01M 8/1058* (2016.01)

(52) U.S. Cl.
CPC ....... *H01M 8/1004* (2013.01); *H01M 8/1058* (2013.01)

(58) Field of Classification Search
CPC ............. H01M 8/1004; H01M 8/1058; H01M 2008/1095; H01M 8/0286; H01M 8/0273; Y02E 60/50; Y02P 70/50
See application file for complete search history.

(56) References Cited

U.S. PATENT DOCUMENTS

2011/0151350 A1* 6/2011 Iverson ............... H01M 8/2418
                                                    429/479
2021/0202970 A1* 7/2021 Lee ..................... H01M 8/0276

FOREIGN PATENT DOCUMENTS

JP       2013161557 A    8/2013
KR       101719695 B1    3/2017
KR       20210085623 A   7/2021

* cited by examiner

*Primary Examiner* — Daniel S Gatewood
(74) *Attorney, Agent, or Firm* — MCDONNELL BOEHNEN HULBERT & BERGHOFF LLP

(57) ABSTRACT

Disclosed is an apparatus for manufacturing a fuel cell. When blanking a continuous membrane electrode assembly (MEA) into individual MEAs and then bonding the individual MEAs to a sub-gasket, a scrap electrolyte membrane located at the continuous MEA is prevented from being bonded to a sub-gasket by release-purpose surface roughness formed on a surface thereof, so that it is possible to prevent manufacturing defects of the fuel cell. Further, when the individual MEAs are bonded to the sub-gasket, the continuous MEA is intended to be well bonded to the sub-gasket up to edge portions of the individual MEAs by the pressing force of a pattern roll.

11 Claims, 6 Drawing Sheets

APPARATUS FOR MANUFACTURING FUEL CELL AND METHOD OF MANUFACTURING SAME

CROSS REFERENCE TO RELATED APPLICATION

The present application claims priority to Korean Patent Application No. 10-2022-0003223, filed Jan. 10, 2022, the entire contents of which are incorporated herein for all purposes by this reference.

BACKGROUND

Field

The present disclosure relates to an apparatus for manufacturing a fuel cell and a method of manufacturing the same, and more particularly, to an apparatus and method of manufacturing a fuel cell, which perform blanking on a membrane electrode assembly for the fuel cell and allow the membrane electrode assembly to be easily bonded to a sub-gasket.

Description of the Related Art

In general, a fuel cell includes a membrane electrode assembly (MEA) that is made up of a polymer electrolyte membrane for moving hydrogen protons, a cathode and an anode, both of which are catalyst layers (i.e. electrode layers) that are applied to opposite surfaces of the polymer electrolyte membrane so as to allow a reaction between hydrogen and oxygen, and so on.

Further, gas diffusion layers (GDLs), which are used for diffusion movement of gases such as hydrogen and air, and separator plates, which have channels so as to feed hydrogen and air to the catalyst layers and to discharge water generated by an electricity generation reaction, are stacked in turn at portions outside the cathode and the anode.

In this case, MEA is bonded to the sub-gasket before the GDLs and the separator plates are stacked on the cathode and the anode of the MEA.

The sub-gasket functions to support the MEA that makes up each unit cell of the fuel cell, and to airtightly or watertightly seal a manifold that is a passage for hydrogen, air, a coolant, and the like.

Here, a conventional method of bonding the MEA to the sub-gasket will be described below with reference to FIGS. 1 and 2.

First, a continuous MEA, which is continuously manufactured without being separated in each unit, is rolled around the MEA winding roll along with the carrier film.

The continuous MEA 10, as illustrated in FIG. 1, means that a cathode 12-1 and an anode 12-2, of which an electrode layer 12 is made up, are applied to opposite surfaces of a continuous electrolyte membrane 11 having a given length, at given intervals in a longitudinal direction.

Next, the carrier film 20 is rolled out of the MEA winding roll, and simultaneously the continuous MEA 10 placed on the carrier film 20 is rolled out. The continuous MEA 10 and the carrier film 20 are migrated to a blanking section.

Subsequently, the continuous MEA 10 is separated into individual MEAs 30 by blanking of the blanking section, and separation lines 40 by which the continuous MEA 10 is separated into the individual MEAs 30 and which are depicted in FIG. 2 by a dot line, are compartmented on the continuous electrolyte membrane 11 that is separated by a preset distance around the electrode layer 12.

In this case, the electrolyte membrane located outside the separation lines 40 becomes an unnecessary scrap electrolyte membrane 11-1.

Finally, the individual MEAs 30 and the scrap electrolyte membrane 11-1 are moved to a process of bonding with the sub-gasket while being still placed on the carrier film, and then are bonded with a pair of sub-gaskets 50 by an adhesive, as illustrated in FIG. 3.

However, the conventional method of bonding the MEAs and the sub-gaskets has the following problems.

First, when the continuous MEA 10 is separated into the individual MEAs 30, and then is bonded to the sub-gaskets 50, only the individual MEAs 30 should be selectively bonded to the sub-gaskets 50; however, the individual MEAs 30 are bonded to the sub-gaskets 50 along with the unnecessary scrap electrolyte membrane 11-1 that is the electrolyte membrane located outside the separation lines 40. Thus, the bonding quality between the individual MEA and the sub-gasket is lowered, which causes poor manufacturing of the fuel cell.

Second, when the individual MEA 30 is bonded with a pair of sub-gaskets 50 by, for instance, a roll press, a bonding pressure against edge portions of the individual MEA 30 is insufficient, so that there is a problem in that defects such as wrinkles or air bubbles are generated from the edge portions of the individual MEAs 30 and the sub-gaskets 50.

SUMMARY

The present disclosure has been devised to solve the above-mentioned conventional problems as described above, and is intended to provide an apparatus and a method of manufacturing a fuel cell, which can prevent a scrap electrolyte membrane from being adhered to a sub-gasket due to release-purpose surface roughness by forming release-purpose fine surface roughness on the surface of a scrap electrolyte membrane which is present in continuous membrane electrode assemblies (MEAs) when the continuous MEAs are subjected to blanking, and which can ensure that only an individual MEA is selectively bonded to the sub-gasket.

Further, the present disclosure is intended to provide an apparatus and method of manufacturing a fuel cell in which a pattern roll for applying a pressure up to edge portions of individual MEAs is formed at a roll for bonding between the individual MEAs and a sub-gasket in a protruding form, so that the individual MEAs are well bonded to the sub-gasket up to the edge portions of individual MEAs by a pressing force of the pattern roll when the individual MEAs are bonded to the sub-gasket, in order to prevent defects such as wrinkles or air bubbles from being generated from edge portions between the individual MEAs and the sub-gaskets.

According to an embodiment of the present disclosure, an apparatus for manufacturing a fuel cell may include a blanking section configured to perform blanking (or punching) on a continuous membrane electrode assembly (MEA) withdrawn from an MEA winding roll into individual MEAs and to form release-purpose surface roughness on a surface of a scrap electrolyte membrane, a bonding roll configured to bond a sub-gasket withdrawn from a sub-gasket winding roll to the individual MEAs, and a variable control roll configured to press the continuous MEA transferred from the blanking section toward the bonding roll, and configured to selectively bond only the individual MEAs of the continuous MEA to the sub-gasket.

The blanking section may include a blanking roll, a blanking plate adhered to a surface of the blanking roll, a blanking blade formed on a surface of the blanking plate and blanking the continuous MEA into the individual MEAs, and a surface roughness forming member attached to an outer surface of the blanking blade which is located at the surface of the blanking plate by an adhesive in order to form the release-purpose surface roughness.

In particular, the surface roughness forming member may be adopted as a porous sheet.

The porous sheet may be an expanded polytetrafluoroethylene (e-PTFE) sheet having a plurality of microholes.

The porous sheet may be an anodic aluminum oxide (AAO) template whose surface is formed of a plurality of nanoholes by anodization of aluminum.

The blanking plate may be attached to the blanking roll by a magnet or an adhesive.

The blanking plate may have ventilation holes for discharging air confined inside the blanking section when the blanking blade performs blanking on the individual MEAs.

A support roll which supports the continuous MEA withdrawn from the MEA winding roll may be disposed on the opposite side of the blanking roll and heater rods for heating the scrap electrolyte membrane of the continuous MEA are internally installed in the support roll.

The variable control roll may have a first pattern roll that is formed to protrude from the continuous MEA and that presses only the individual MEAs against the sub-gasket that passes the bonding roll.

According to another embodiment of the present disclosure, a method of manufacturing a fuel cell may include blanking a continuous MEA withdrawn from an MEA winding roll into individual MEAs and forming release-purpose surface roughness on a surface of a scrap electrolyte membrane located at the continuous MEA, and bonding the individual MEAs to a sub-gasket withdrawn from a sub-gasket winding roll, wherein, when the individual MEAs are bonded to the sub-gasket, the scrap electrolyte membrane is designed to prevent the scrap electrolyte membrane from being attached to the sub-gasket by the release-purpose surface roughness.

The method of manufacturing a fuel cell in the present disclosure may further include heating the scrap electrolyte membrane of the continuous MEA when the release-purpose surface roughness is provided on the surface of the scrap electrolyte membrane located at the continuous MEA.

When the individual MEAs are bonded to the sub-gasket, only the individual MEAs may be selectively pressed from the continuous MEA by a first pattern roll of the variable control roll, and be bonded to the sub-gasket by the first pattern roll of the variable control roll.

When the individual MEAs are bonded to the sub-gasket, only the individual MEAs may be selectively supported on and bonded to the sub-gasket from the continuous MEA by the second pattern roll of the bonding roll.

The present disclosure provides the following effects through the means for solving the above problems.

First, when the continuous MEA is subjected to blanking into the individual MEAs and then the individual MEAs are bonded to the sub-gasket, the scrap electrolyte membrane located at the continuous MEA is prevented from being bonded to the sub-gasket by the release-purpose surface roughness formed on the surface thereof, so that it is possible to prevent manufacturing defects of the fuel cell. Consequently, it is possible to ensure that only the individual MEAs are selectively bonded to the sub-gasket.

Second, when the individual MEAs are bonded to the sub-gasket, the individual MEAs are well bonded to the sub-gasket up to the edge portions of the individual MEAs by the pressing force of the pattern roll. Thus, it is possible to prevent winkles or air bubbles from being generated from the edge portion between the individual MEA and the sub-gasket.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION

Hereinafter, preferred embodiments of the present disclosure will be described with reference to the attached drawings.

Figure 4:
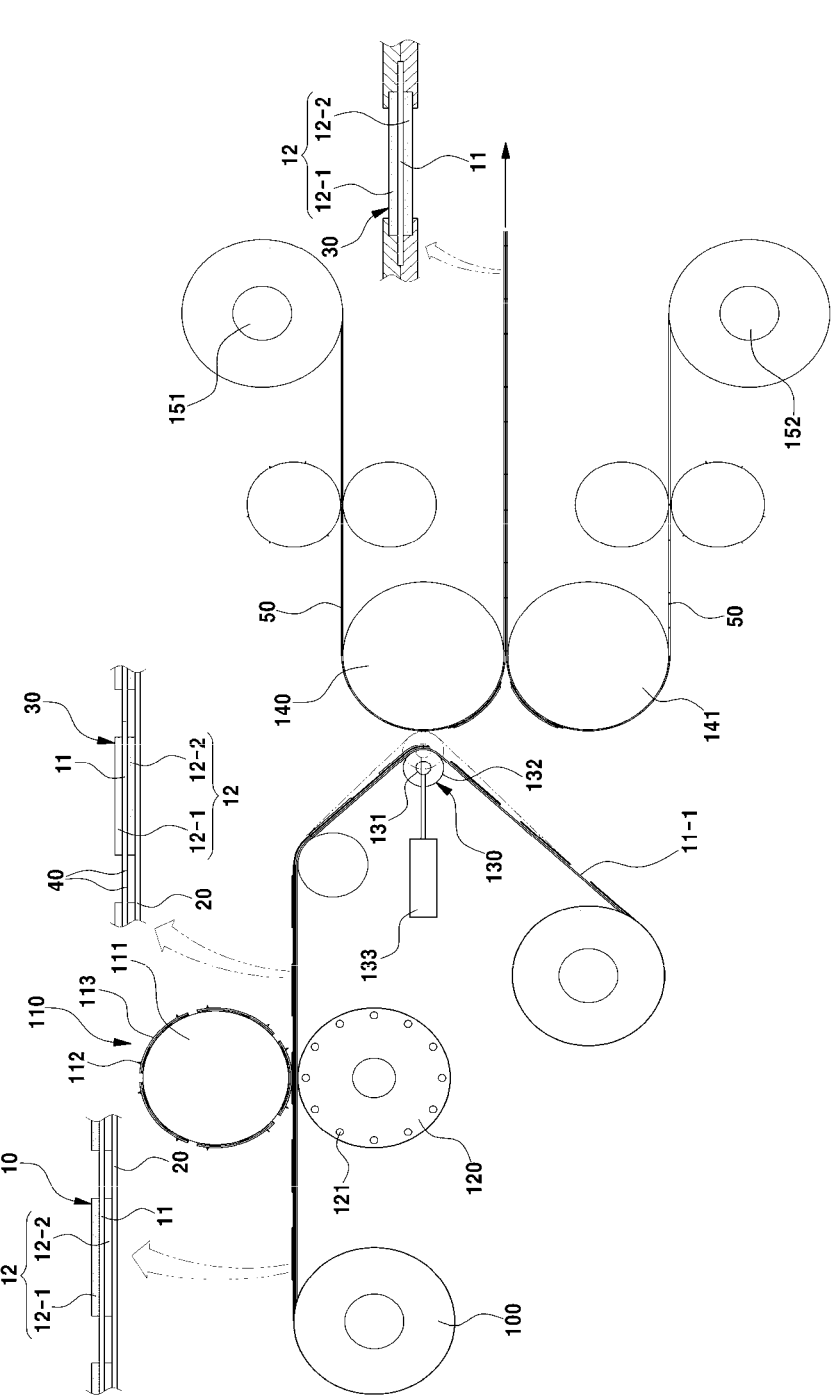
FIG. 4 is a schematic view illustrating an overall layout configuration of a fuel cell manufacturing apparatus.
Figure 5:
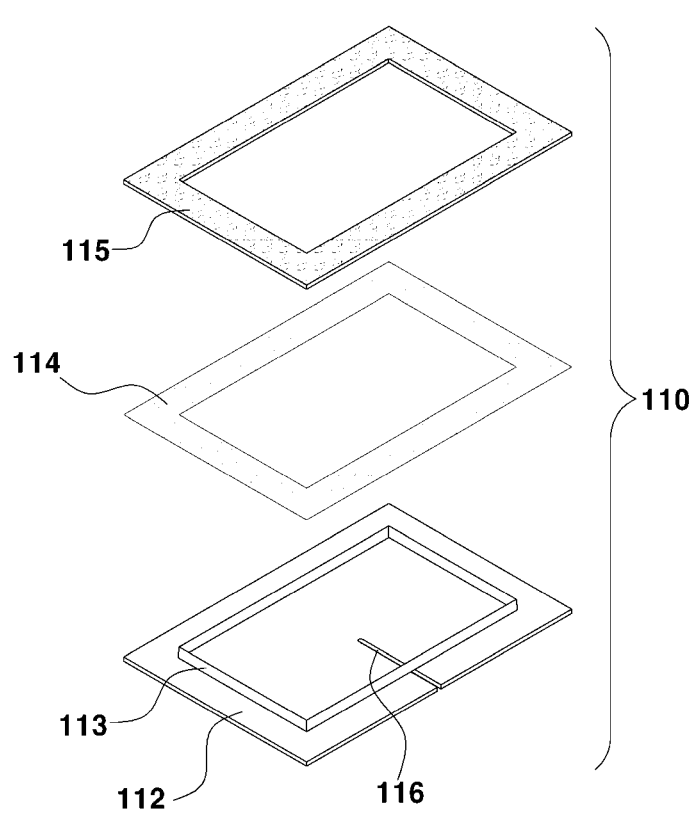
FIG. 5 is a dissembled perspective view illustrating a punching section of the fuel cell manufacturing apparatus according to the present disclosure.
Figure 6:
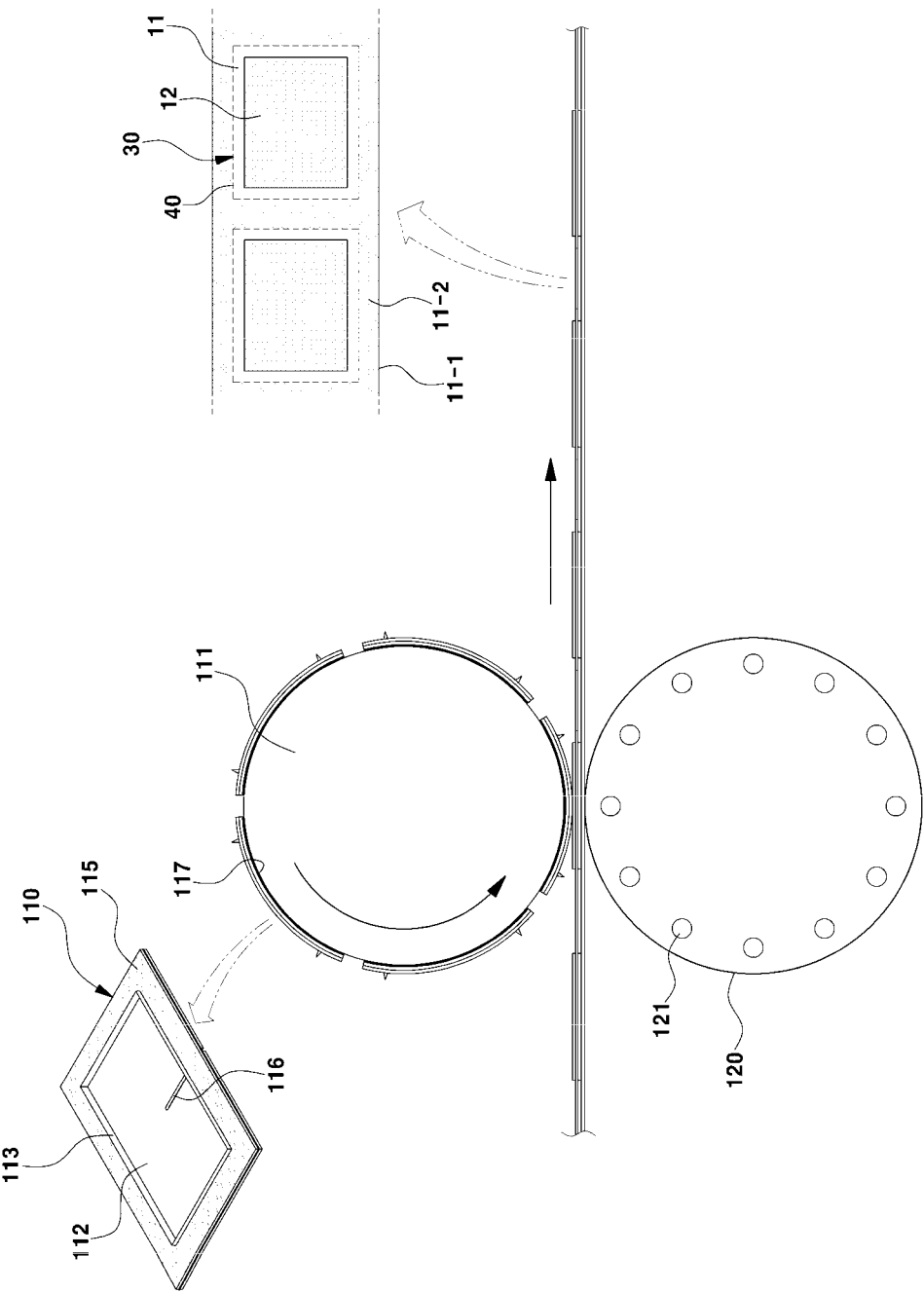
FIG. 6 is a schematic view illustrating a state in which the punching section of the fuel cell manufacturing apparatus according to the present disclosure is mounted on punching rolls.

FIG. 4 is a schematic view illustrating an overall layout configuration of a fuel cell manufacturing apparatus, FIG. 5 is a dissembled perspective view illustrating a punching section of the fuel cell manufacturing apparatus according to the present disclosure, and FIG. 6 illustrates a structure in which punching sections of the fuel cell manufacturing apparatus according to the present disclosure is mounted on punching rolls.

As illustrated in FIG. 4, a continuous membrane electrode assembly (MEA) 10, which is continuously manufactured without being separated in each unit, is formed on an MEA winding roll 100 along with a carrier film 20.

Figure 1:
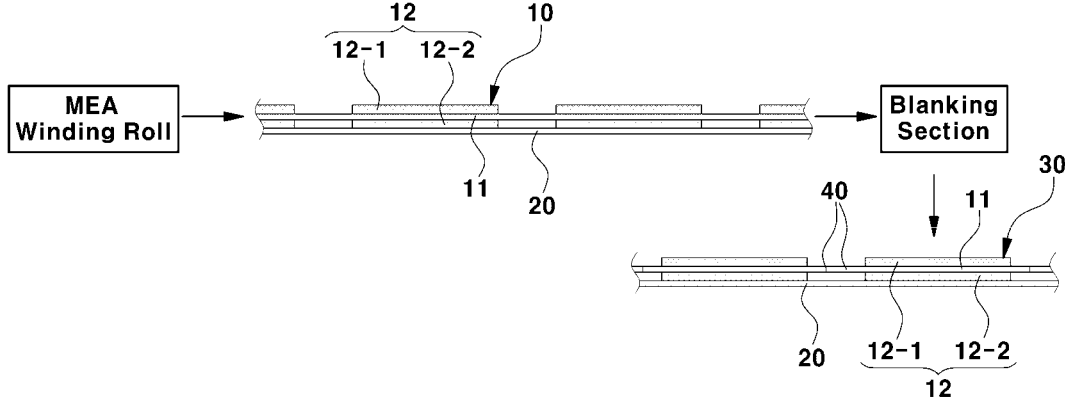
FIG. 1 is a schematic view illustrating a conventional method of bonding a membrane electrode assembly (MEA) to a sub-gasket.
Figure 2:
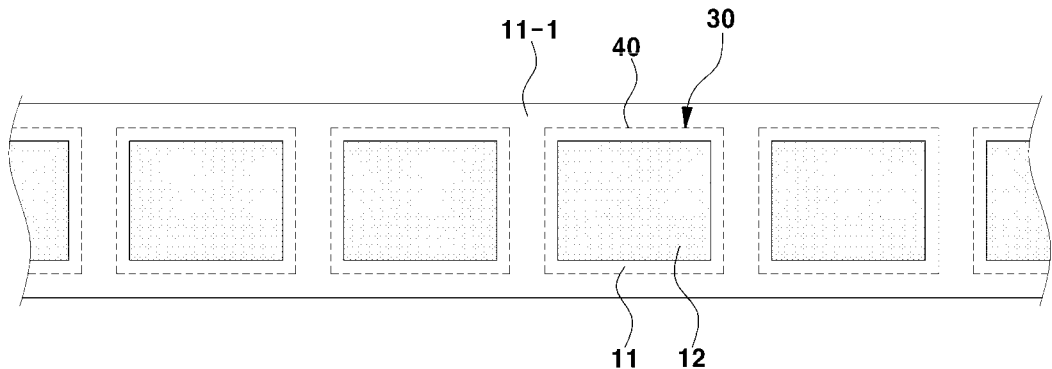
FIG. 2 is a schematic view illustrating a conventional method of bonding a membrane electrode assembly (MEA) to a sub-gasket.
Figure 3:
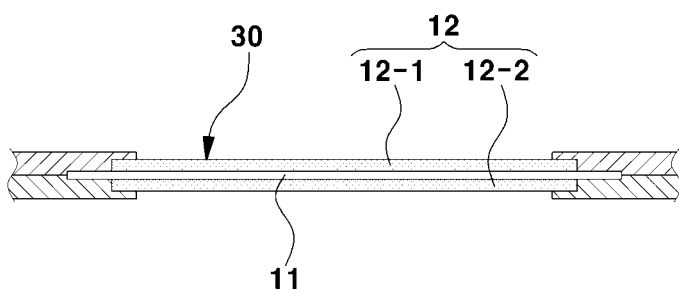
FIG. 3 is a schematic view illustrating a conventional method of bonding a membrane electrode assembly (MEA) to a sub-gasket.

As described above with reference to FIG. 1, the continuous MEA 10 means that a cathode 12-1 and an anode 12-2, of which an electrode layer 12 is formed, are adhered to opposite surfaces of a continuous electrolyte membrane 11 that is continuous at a given length at a given interval in a longitudinal direction.

In particular, a blanking section 110 is disposed at a front position of the MEA winding roll 100, and is thus provided a structure in which the blanking section 110 performs blanking on the continuous MEA 10, which is unrolled from the MEA winding roll 100, in a form of the individual MEAs 30, and in which release-purpose surface roughness 11-2 is formed on a surface of the scrap electrolyte membrane 11-1 located at the continuous MEA 10.

To this end, as illustrated in FIG. 5 and FIG. 6, the blanking section 110 includes a punching roll 111, blanking plates 112 that are mounted on a surface of the punching roll 111 at given intervals in a circumferential direction, a quadrilateral frame-shaped blanking blade 113 that is formed on one surface of the blanking plate 112 and blanks the continuous MEA 10 into the individual MEAs 30, and a surface roughness forming member 115 that is adhered to one surface of the blanking plate 112, which is located outside the blanking blade 113, by an adhesive 114.

In this case, the surface roughness forming member 115 is adopted from a porous sheet that forms release-purpose surface roughness 11-2 for giving a slippage characteristic and a water repellent characteristic to one surface of the scrap electrolyte membrane 11-1 that is present within the continuous MEA 10.

Preferably, the porous sheet adopted as the surface roughness forming member 115 may be an expanded polytetrafluoroethylene (e-PTFE) sheet that has a plurality of microholes and is cut in a given size.

Further, the porous sheet adopted as the surface roughness forming member 115 may be an anodic aluminum oxide (AAO) template, on which a plurality of nanoholes are formed by aluminum anodization, and which is cut in a given size.

Further, the blanking plate 112 is formed with a ventilation hole 116 that communicates with an interior of the blanking blade 113 shaped of a quadrilateral frame. This ventilation hole 116 functions to prevent a negative pressure between the blanking blade 113 and the individual MEAs 30 when the blanking blade 113 blanks the continuous MEA 10 into the individual MEAs 30.

Therefore, the blanking section 110 may be finished by adhering the surface roughness forming member 115 to one surface of the blanking plate 112 which is located outside the blanking blade 113 using an adhesive 114 (e.g., an acrylate adhesive), and then mounting the other surface of the blanking plate 112 located on a surface of a blanking roll 111 at given intervals in a circumferential direction.

In this case, the other surface of the blanking plate 112 may be mounted on the surface of the blanking roll 111 by magnets 117 or an adhesive.

Preferably, among the components of the blanking section 110 provided such as the above, the blanking blade 113 should be pressed only up to a thickness of the continuous MEA 10 located at the carrier film 20, and thus its height may be set to about 20 to 30 microns. A height of the surface roughness forming member 115 may be set to 1 to 5 microns. A height of the adhesive 114 may be set to 5 to 10 microns.

A height of the blanking blade 113, a height of the surface roughness forming member 115, and a height of the adhesive 114 may be variably set according to a height of the electrolyte membrane of the continuous MEA 10 that is a target for blanking.

Therefore, the continuous MEA 10 is divided into the individual MEAs 30 by the blanking blade 113 formed on the blanking plate 112 of the blanking section 110. Simultaneously, the continuous MEA 10 comes into contact with the surface of the unnecessary scrap electrolyte membrane 11-1 located outside the individual MEAs 30, and provides the release-purpose surface roughness 11-2 for endowing a slippage characteristic and a water repellent characteristic.

Meanwhile, the continuous MEA 10 and the carrier film 20, which are taken out of the MEA winding roll 100, are disposed on the side opposite to the blanking roll 111, and heater rods 121 for heating the scrap electrolyte membrane 11-1 of the continuous MEA 10 are installed inside support roll 120.

In this case, the heater rods 121 heat the support roll 120 to a given temperature, and function to transfer heat to the scrap electrolyte membrane 11-1 of the continuous MEA 10 that is placed on the support roll 120 or passes through the support roll 120.

Therefore, the scrap electrolyte membrane 11-1 of the continuous MEA 10, which is placed on the support roll 120 or passes through the support roll 120, is heated to a given temperature, so that the release-purpose surface roughness 11-2 can be well provided to the scrap electrolyte membrane 11-1 by the surface roughness forming member 115.

Preferably, when a heating temperature of the heater rods 121 is low compared to a deformable temperature of the electrolyte membrane, which is determined according to a type of the electrolyte membrane included in the continuous MEA 10, the release-purpose surface roughness is not well formed. Further, when a heating temperature of the heater rods 121 is higher, deformation of the electrolyte membrane may be caused. For this reason, the heating temperature of the heater rods 121 is appropriately from about 70° C. to 150° C.

Meanwhile, as can be seen from FIG. 4, a variable control roll 130 for selectively bonding only the individual MEA 30 to the sub-gasket 50 from the continuous MEA 10 is disposed at a front position of the blanking section 110 on the basis of the withdrawal direction of the continuous MEA.

The variable control roll 130 has a structure for pressing only the individual MEAs 30 toward the bonding roll 140, through which the sub-gasket 50 passes, from the continuous MEA 10 transferred from the blanking section 110.

Figure 7:
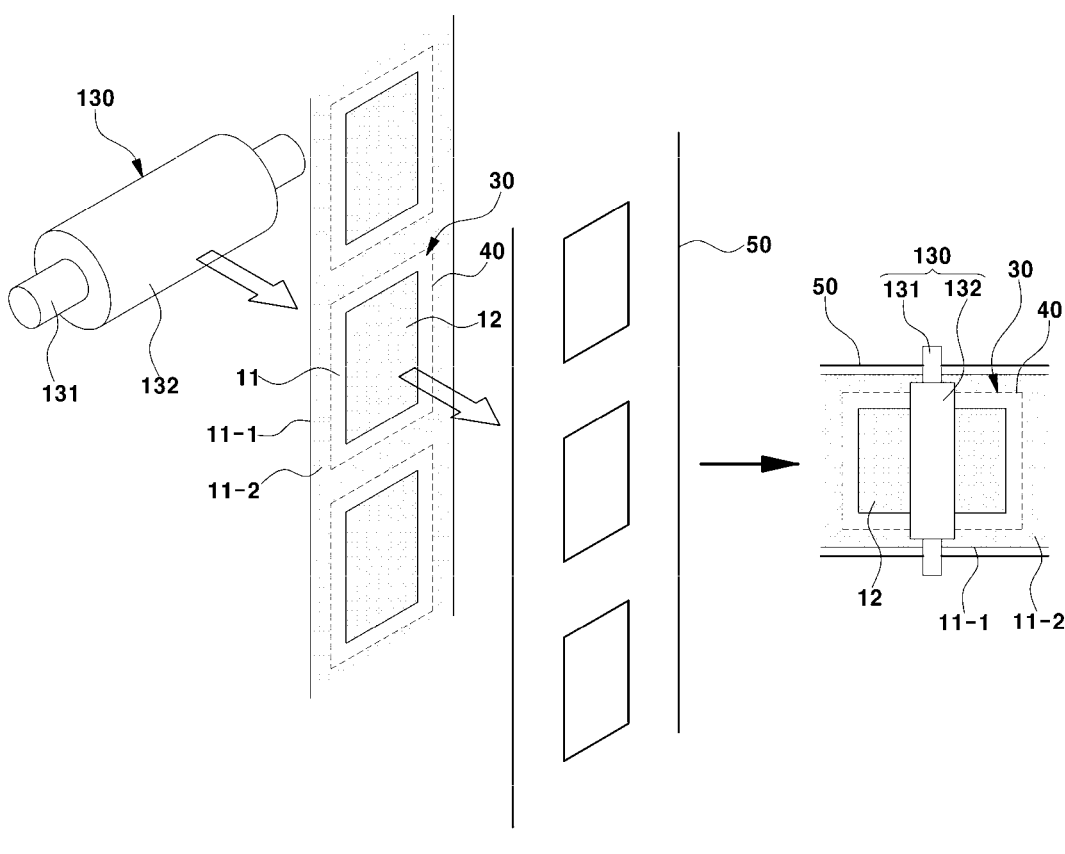
FIG. 7 is a schematic view illustrating how first pattern rolls formed at a variable control roll of the variable control roll of the fuel cell manufacturing apparatus according to the present disclosure pressurize individual MEAs.

To this end, as illustrated in FIG. 7, small-diameter rolls 131 are provided at the opposite sides of the variable control roll 130, and a first pattern roll 132 having a larger diameter than the small-diameter rolls 131 is provided at an intermediate portion of the variable control roll 130. Preferably, the first pattern roll 132 is formed to have a larger width than the individual MEA 30 by about 1 mm to 3 mm.

Further, as illustrated in FIG. 4, an actuator 133 such as a hydraulic cylinder or a pneumatic cylinder, which is used for causing the variable control roll 130 to move toward or backward the bonding roll 140 again, is connected to the small-diameter rolls 131 of the variable control roll 130.

Therefore, after the continuous MEA 10 is transferred from the blanking section 110 to the variable control roll 130, when the variable control roll 130 is advanced toward the bonding roll 140 by forward driving of the actuator 133 while pushing the continuous MEA 10, the first pattern roll 132 presses, as illustrated in FIG. 7, only the individual MEAs 30 that have already undergone blanking at the blanking section 110, and presses the sub-gasket 50 that it passes d through the bonding roll 140. Thereby, only the individual MEAs 30 can be selectively bonded to the sub-gasket 50 from the continuous MEA 10.

In this case, the first pattern roll 132 is in a state in which it is formed to have a greater width than the individual MEAs 30 by about 1 mm to 3 mm. For this reason, when bonded to the sub-gaskets 50, the individual MEAs 30 can be well bonded to the sub-gaskets 50 up to the edge portions of the individual MEAs 30 by a pressing force of the first pattern roll 132. Accordingly, it is possible to easily prevent a phenomenon in which wrinkles or air bubbles resulting from a defect such as non-bonding are generated from an edge portion between the individual MEA 30 and the sub-gasket 50.

In particular, when only the individual MEAs 30 are selectively bonded to the sub-gasket 50 from the continuous MEA 10, the release-purpose surface roughness 11-2 has already formed on the surface of the unnecessary scrap electrolyte membrane 11-1 that is located outside the individual MEA 30 as described above. For this reason, the scrap electrolyte membrane 11-1 can be easily prevented from being bonded to the sub-gasket 50 by the release-purpose surface roughness 11-2.

Meanwhile, a pair of sub-gaskets 50 are bonded with the four edge portions of the individual MEAs 30 interposed therebetween.

That is, one of the sub-gaskets 50 is bonded to upper surfaces of the four edge portions of the individual MEAs 30, and the other sub-gasket 50 is bonded to lower surfaces of the four edge portions of the individual MEAs 30.

To this end, as illustrated in FIG. 4, the bonding roll 140, through which passes one of the sub-gaskets 50 withdrawn from the first sub-gasket winding roll 151, is disposed at the opposite side of the variable control roll 130, and the sub-bonding roll 141 through which passes the other sub-gasket 50 withdrawn from the second sub-gasket winding roll 152 is disposed under the bonding roll 140.

Therefore, as described above, when only the individual MEAs 30 are bonded to one of the sub-gaskets 50, which passes through the bonding roll 140 from the continuous MEA 10, by the first pattern roll 132 of the variable control roll 130, and then pass between the bonding roll 140 and the sub-bonding roll 141, the individual MEAs 30 can also be bonded with the other sub-gasket 50 that passes through the sub-bonding roll 141.

Figure 8:
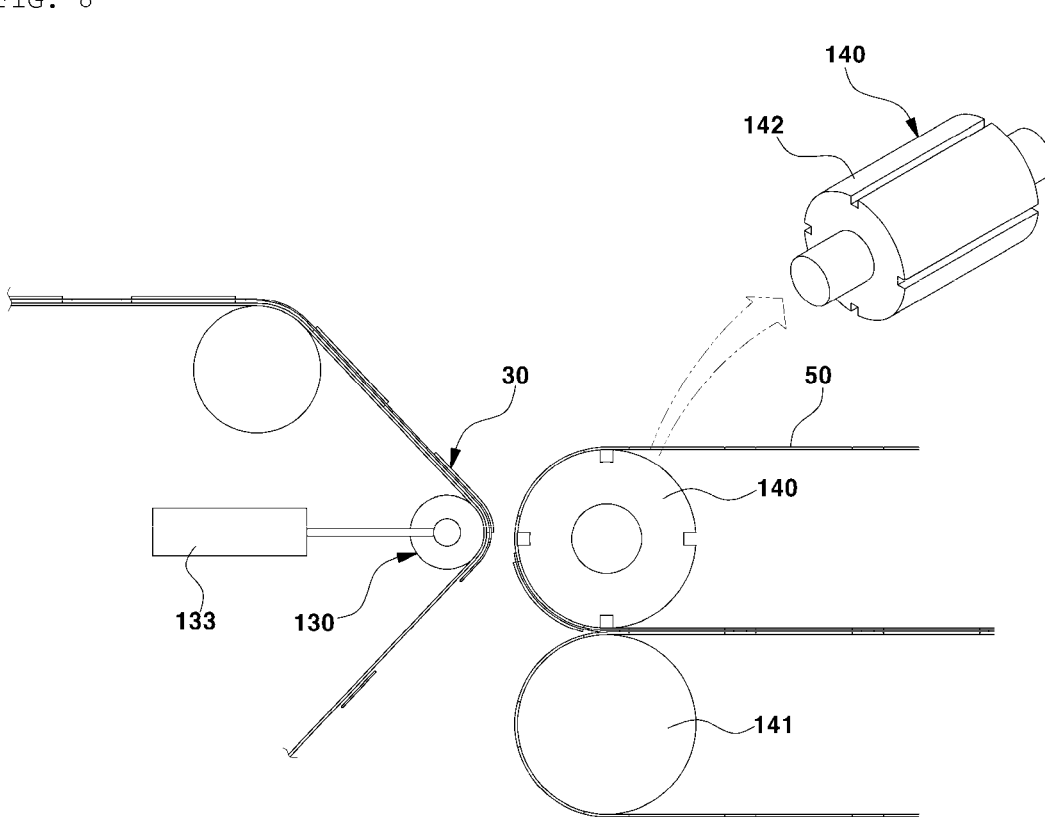
FIG. 8 is a schematic view illustrating how second pattern rolls formed at the bonding roll of the fuel cell manufacturing apparatus according to the present disclosure is pressurized and supported on the individual MEAs.

Meanwhile, as illustrated in FIG. 8, the second pattern roll 142, which is supported to be more tightly bonded to the sub-gasket 50 such that the individual MEAs 30 are pressurized against the sub-gasket 50 by the variable control roll 130, is provided to protrude from the bonding roll 140. Preferably, the second pattern roll 142 is also provided to be wider than the individual MEAs 30 by about 1 mm to 3 mm.

Therefore, when the individual MEAs 30 are bonded to the sub-gaskets 50 by a pressing force of the variable control roll 130, the second pattern roll 142 of the bonding roll 140 supports the individual MEAs 30 up to the edges of the individual MEAs 30. For this reason, the individual MEAs 30 can be well bonded to the sub-gaskets 50, and thereby it is possible to easily prevent a phenomenon in which wrinkles or air bubbles resulting from a defect such as non-bonding are generated from an edge between the individual MEA 30 and the sub-gasket 50.

Preferably, for the purpose of tight bonding between the individual MEA 30 and the sub-gasket 50, one or all of the first pattern roll 132 of the variable control roll 130 and the second pattern roll 142 of the bonding roll 140 can be adopted.

Herein, the method of manufacturing a fuel cell of the present disclosure based on the above configuration will be described again in turn, which is as follows.

First, the continuous MEA 10, which is continuously manufactured without being separated from the MEA winding roll 100 in an individual unit, is taken out along with the carrier film 20, and is moved to the blanking section 110.

Next, by the punching blade 113 formed at the blanking plate 112 of the blanking section 110, the continuous MEA 10 is divided into the individual MEAs 30, and simultaneously the surface roughness forming member 115 comes into contact with the surface of the unnecessary scrap electrolyte membrane 11-1 located outside the individual MEAs 30, and provides release-purpose surface roughness 11-2 for endowing a slippage characteristic and a water repellent characteristic.

Preferably, a range of surface roughness Rz of the release-purpose surface roughness 11-2 formed on the surface of the scrap electrolyte membrane 11-1 by the surface roughness forming member 115 is designed to range from 3 to 50 microns. The reason is that the scrap electrolyte membrane 11-1 can be prevented from being attached to the sub-gaskets 50 by the release-purpose surface roughness 11-2.

When the continuous MEA 10 is divided into the individual MEAs 30 by the blanking blade 113 of the blanking plate 112, a negative pressure is generated while air is confined in a space between the blanking blade 113 and the individual MEA 30, and the individual MEA 30 may be sucked toward the blanking plate 112 while becoming loose.

However, when the continuous MEA 10 is divided into the individual MEAs 30 by the blanking blade 113 of the blanking plate 112, air confined in a space between the blanking blade 113 and the individual MEA 30 may be exhausted through the ventilation hole 116 formed in the blanking plate 112. For this reason, the generation of the negative pressure can be prevented, and it is possible to easily prevent a phenomenon in which the individual MEAs 30 are sucked toward the blanking plate 112 while becoming loose.

Further, when the surface roughness forming member 115 forms the release-purpose surface roughness 11-2 on the surface of the unnecessary scrap electrolyte membrane 11-1 located outside the individual MEAs 30, the scrap electrolyte membrane 11-1 of the continuous MEA 10 enters the state in which it is heated to a given temperature due to heating of the heater rods 121 that are internally installed in the support roll 120. Thereby, the release-purpose surface roughness 11-2 can be well formed at the scrap electrolyte membrane 11-1 by the surface roughness forming member 115.

Next, the continuous MEA 10, which includes the scrap electrolyte membrane 11-1 in which the individual MEAs 30 and the release-purpose surface roughness 11-2 are formed, is moved from the blanking section 110 to the variable control roll 130.

Subsequently, due to the forward driving of the actuator 133, the variable control roll 130 is advanced toward the bonding roll 140 while pushing the continuous MEA 10, and a sheet of sub-gasket 50 is withdrawn from the first sub-gasket winding roll 151 to the bonding roll 140, and simultaneously the other sheet of sub-gasket 50 is withdrawn from the second sub-gasket winding roll 152 to the sub-bonding roll 141.

Preferably, the sub-gaskets 50 have previously applied with an adhesive that is used for bonding with the individual MEAs 30.

Thereby, the first pattern roll 132 of the variable control roll 130 causes only the individual MEAs 30 to be pressurized against a sheet of sub-gasket 50 that passes through the bonding roll 140. Thereby, only the individual MEAs 30 from the continuous MEA 10 can be bonded to the sheet of sub-gasket 50.

In this case, because the first pattern roll 132 has been formed to be about 1 to 3 mm wider than the individual MEAs 30, when the individual MEAs 30 are bonded to the sub-gaskets 50, the individual MEAs 30 can be well bonded to the sub-gaskets 50 up to the edge portions of the individual MEAs 30 by the pressing force of the first pattern roll 132. Thereby, it is possible to easily prevent a phenomenon in which wrinkles or air bubbles resulting from a defect such as non-bonding are generated from an edge between the individual MEA 30 and the sub-gasket 50.

Simultaneously, when only the individual MEA 30 is bonded to the sub-gasket 50 from the continuous MEA 10, the release-purpose surface roughness 11-2 has already been formed, as described above, on the surface of the unnecessary scrap electrolyte membrane 11-1 located outside the individual MEA 30, and thus it is possible to easily prevent the scrap electrolyte membrane 11-1 from being bonded to the sub-gasket 50 by the release-purpose surface roughness 11-2.

In other words, when the continuous MEA 10 is subjected to blanking into the individual MEAs 30 and then the individual MEAs 30 are bonded to the sub-gasket 50, the scrap electrolyte membrane 11-1 located at the continuous MEA 10 is prevented from being bonded to the sub-gasket 50 by the release-purpose surface roughness 11-2 formed on the surface thereof, so that it is possible to prevent manufacturing defects of the fuel cell. Consequently, it is possible to make ensure that only the individual MEAs 30 are selectively bonded to the sub-gasket 50.

Meanwhile, the scrap electrolyte membrane 11-1 is wound around a scrap roll 150 for the purpose of recycle or disposal.

Next, when only the individual MEAs 30 are bonded to a sheet of sub-gasket 50 that passes through the bonding roll 140, and then pass between the bonding roll 140 and the sub-bonding roll 141, the individual MEAs 30 are also bonded to another sheet of sub-gasket 50 that passes through the sub-bonding roll 141.

In this case, when the individual MEAs 30 are bonded to a sheet of sub-gasket 50, which passes through the bonding roll 140, by a pressing force of the first pattern roll 132, the individual MEAs 30 is supported from the second pattern roll 142 of the bonding roll 140 to the edge portions of the individual MEAs 30.

In addition, when only the individual MEA 30 is bonded to a sheet of sub-gasket 50 and then passes between the bonding roll 140 and the sub-bonding roll 141, the individual MEAs 30 are pressed from the second pattern roll 142 of the bonding roll 140 to the edge portions of the individual MEA 30, and thereby the individual MEAs 30 can be well bonded to the sub-gasket 50. Accordingly, it is possible to easily prevent a phenomenon in that wrinkles or air bubbles resulting from a non-bonding defect at the edge portion between the individual MEA 30 and the sub-gasket 50 are generated.

Up to now, the present disclosure has been described in detail with reference to one embodiment. However, the scope of the present disclosure is not limited to the above-mentioned embodiments, and various alterations and improvements, which are defined in the following claims and are made by those skilled in the art who make use of basic concepts of the present disclosure, will be also included within the scope of the present disclosure.

What is claimed is:

1. An apparatus for manufacturing a fuel cell, the apparatus comprising:

a blanking section configured to perform blanking on a continuous membrane electrode assembly (MEA) withdrawn from an MEA winding roll into individual MEAs and to form surface roughness for endowing a slippage characteristic and a water repellent characteristic on a surface of a scrap electrolyte membrane;

a bonding roll configured to bond a sub-gasket withdrawn from a sub-gasket winding roll to the individual MEAs; and a variable control roll configured to press the continuous MEA transferred from the blanking section toward the bonding roll, and configured to selectively bond only the individual MEAs of the continuous MEA to the sub-gasket.

2. The apparatus for manufacturing a fuel cell according to claim 1, wherein the blanking section includes:

a blanking roll;

a blanking plate adhered to a surface of the blanking roll;

a blanking blade formed on a surface of the blanking plate and blanking the continuous MEA into the individual MEAs; and a surface roughness forming member attached to an outer surface of the blanking blade which is located at the surface of the blanking plate by an adhesive in order to form the surface roughness.

3. The apparatus for manufacturing a fuel cell according to claim 2, wherein the surface roughness forming member is adopted as a porous sheet.

4. The apparatus for manufacturing a fuel cell according to claim 3, wherein the porous sheet is an expanded polytetrafluoroethylene (e-PTFE) sheet having a plurality of microholes.

5. The apparatus for manufacturing a fuel cell according to claim 2, wherein the blanking plate is attached to the blanking roll by a magnet or an adhesive.

6. The apparatus for manufacturing a fuel cell according to claim 2, wherein the blanking plate has ventilation holes for discharging air confined inside the blanking section when the blanking blade performs blanking on the individual MEAs.

7. The apparatus for manufacturing a fuel cell according to claim 2, wherein a support roll, which supports the continuous MEA withdrawn from the MEA winding roll, is disposed on the opposite side of the blanking roll and heater rods for heating the scrap electrolyte membrane of the continuous MEA are internally installed in the support roll.

8. The apparatus for manufacturing a fuel cell according to claim 1, wherein the variable control roll has a first pattern roll that is formed to protrude from the continuous MEA and that presses only the individual MEAs against the sub-gasket that passes the bonding roll.

9. The apparatus for manufacturing a fuel cell according to claim 1, wherein the bonding roll has a second pattern roll that is formed to protrude from the bonding roll and that supports the individual MEAs pressed by the variable control roll so as to be bonded to the sub-gasket.

10. The apparatus for manufacturing a fuel cell according to claim 2, wherein the surface roughness forming member is provided in a structure in which the surface roughness having a surface roughness range of 3 to 50 microns is provided on a surface of the scrap electrolyte membrane.

11. The apparatus for manufacturing a fuel cell according to claim 3, wherein the porous sheet is an anodic aluminum oxide (AAO) template whose surface is formed of a plurality of nanoholes by anodization of aluminum.

\* \* \* \* \*